United States Patent
Wakana

(10) Patent No.: US 7,599,079 B2
(45) Date of Patent: Oct. 6, 2009

(54) IMAGE PROCESSING USING PROCESSING BY BANDS AND FIXED-SIZE WORK BUFFER

(75) Inventor: Toru Wakana, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 11/168,508

(22) Filed: Jun. 29, 2005

(65) Prior Publication Data

US 2005/0254713 A1 Nov. 17, 2005

Related U.S. Application Data

(62) Division of application No. 09/579,502, filed on May 30, 2000, now Pat. No. 7,271,923.

(30) Foreign Application Priority Data

May 31, 1999 (JP) ............................. 11-152812

(51) Int. Cl.
G06F 3/12 (2006.01)
(52) U.S. Cl. ..................... 358/1.13; 375/E7.001
(58) Field of Classification Search ........... 358/1.1–1.8, 358/1.11–1.18, 296; 382/180
See application file for complete search history.

(56) References Cited

U.S. PATENT DOCUMENTS 5,471,563 A * 11/1995 Dennis et al. ............... 358/1.15
5,517,317 A * 5/1996 Kumada ..................... 358/296
5,852,679 A * 12/1998 Shimizu ..................... 382/180
6,124,943 A * 9/2000 Mitani ...................... 358/1.17

FOREIGN PATENT DOCUMENTS

JP 05016437 A * 1/1993
JP 6-87251 A 3/1994

* cited by examiner

*Primary Examiner*—King Y Poon
*Assistant Examiner*—Lennin R Rodriguez
(74) *Attorney, Agent, or Firm*—Fitzpatrick, Cella Harper & Scinto

(57) ABSTRACT

A high-quality image processing apparatus capable of performing image transfer processing using a predetermined work buffer even if different decoding methods are used, without physically increasing the memory capacity. Image data in page description language is inputted into a host I/F unit from an external device such as a host computer. At step S302, a print mode of the input data is examined and a coding method is selected. Next, at step S303, a decoding method corresponding to the coding is checked, and at step S304, a band height (width) is set in correspondence with the decoding method. If the decoding method is a non-realtime decoding method, the band height is reduced to half of that in case of realtime decoding method.

7 Claims, 15 Drawing Sheets

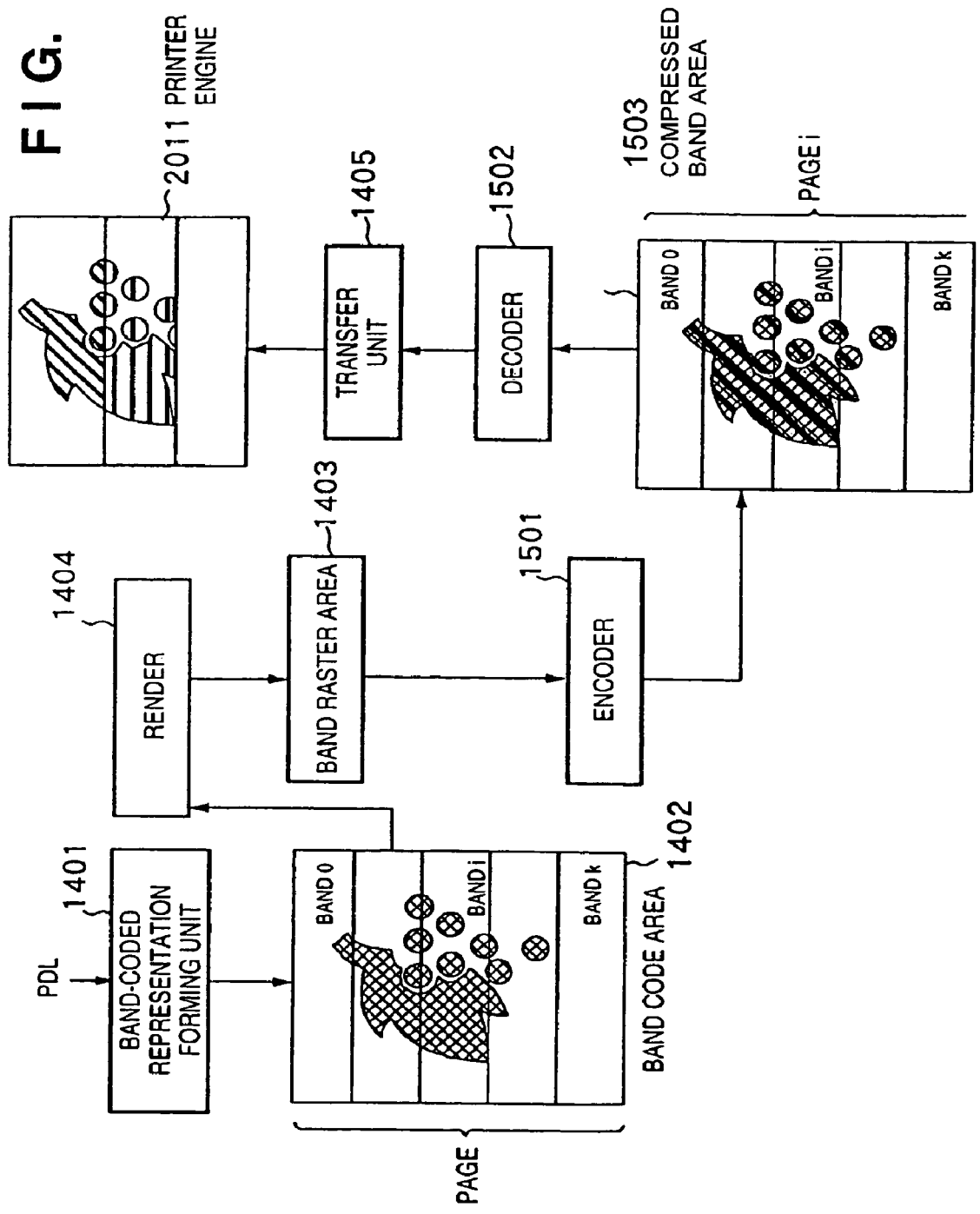

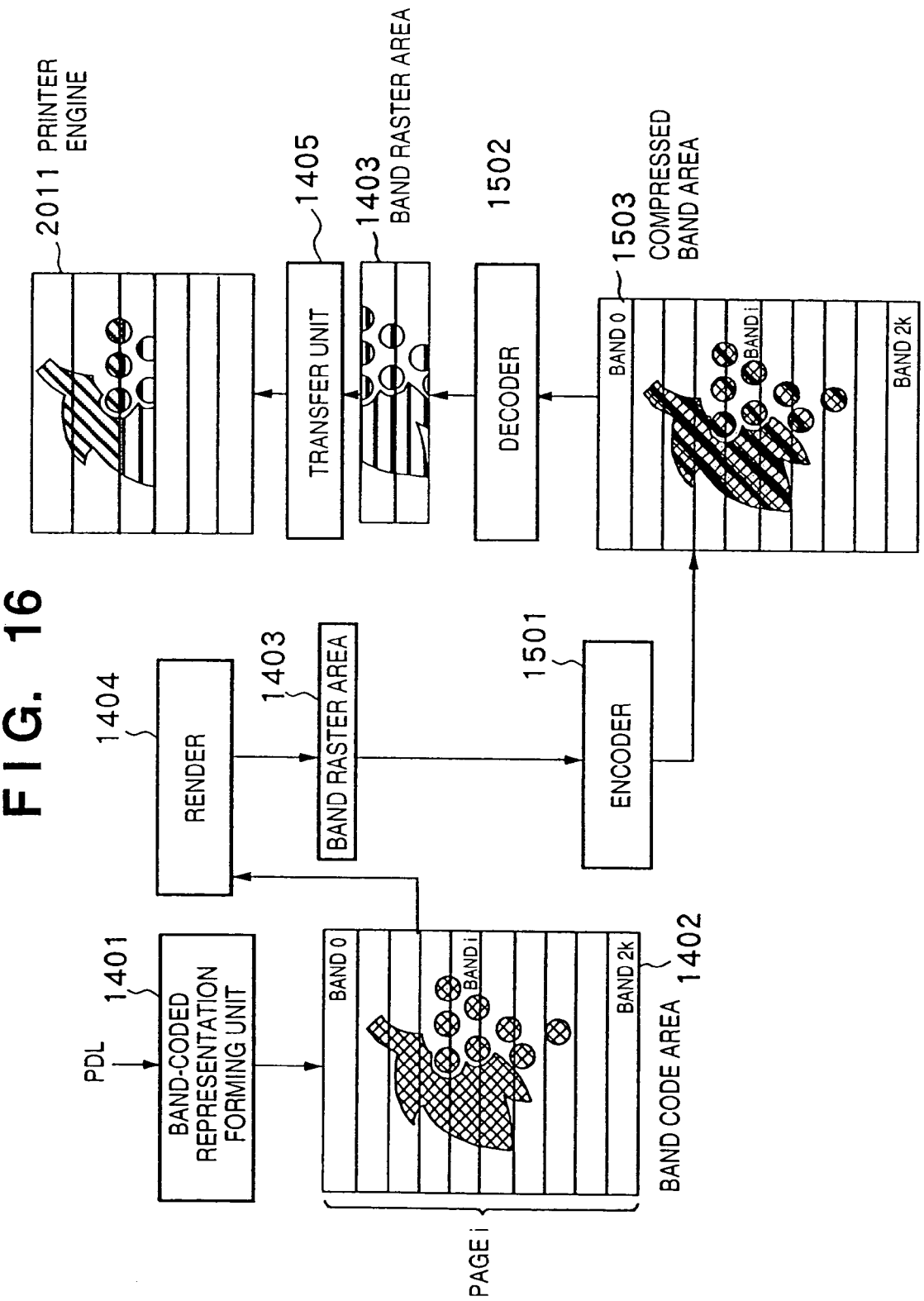

IMAGE PROCESSING USING PROCESSING BY BANDS AND FIXED-SIZE WORK BUFFER

This application is a divisional of U.S. application Ser. No. 09/579,502, filed May 30, 2000, the entire disclosure of which is incorporated herein by reference.

FIELD OF THE INVENTION

The present invention relates to an image processing apparatus, having a function to perform rasterizing in band units, performs rendering, and an image processing method.

BACKGROUND OF THE INVENTION

Conventionally, as an image processing apparatus of this type, a so-called page printer is known. In this apparatus, image processing is performed while holding raster data for one page in a raster memory. The raster data in such image processing apparatus includes not only text but also various images such as a simple figure and a photograph.

In recent years, the resolution of this image processing apparatus has improved, and the memory capacity necessary in accordance with the improvement in resolution has increased. For example, in a resolution of 600 dpi, for generating data for an A4-sized page, a 4 MByte memory is required. The tonality, with which 1 pixel has been conventionally represented by 2 levels, has improved from 16 (4 bits) to 256 (8 bits) levels, thus requiring a larger raster memory. Further, recently, color data is handled in many cases. In such cases, in YMCK space, in comparison with a case of monochrome image processing, the memory capacity for further 4 planes is required, therefore, the memory size is further increasing.

To cut costs increased by such increase in memory size, various memory-saving techniques are proposed. For example, the quantity of a raster memory is suppressed by holding raster data of a band-size and encoding the raster data of bands.

However, in known decoding methods, it is necessary to temporarily store decoded data in a buffer before video transfer is performed to a printer engine. To prevent data underflow to the print engine, it is necessary to perform parallel processing to video transfer one band from one buffer to the printer engine while decode the next band in another buffer. According to the method, two work buffers are necessary, and in comparison with a decoding method in which a work buffer is not required, redundant memories are required. Thus the memory area for storing coded data is reduced.

SUMMARY OF THE INVENTION

The present invention has been made to solve the above-described conventional problems, and has its object to provide a high-quality image processing apparatus and image processing method capable of image transfer processing by using a fixed size work buffer, even if different decoding methods are used, without physically increasing the memory.

To attain the above object, the present invention provides an image processing apparatus comprising: first coding means for performing coding by band having a predetermined height; first decoding means for decoding data coded by said first coding means into bitmap data; memory means for storing bitmap data for one band decoded by said first decoding means; second coding means for encoding the bitmap data stored in said memory means by a coding method selected from plural coding methods; and second decoding means for selecting and performing a first decoding method capable of transferring the bitmap data to a printer engine in realtime, or a second decoding method which needs to render the bitmap data before transferring the data to the printer engine, in accordance with the coding method selected by said second coding means, wherein before coding is performed by said first coding means, decoding processing performed by said second decoding means is predicted, and if the predicted decoding processing is the second decoding processing, the band height is reduced to half of that in case of the first decoding processing.

Further, the present invention provides an image processing apparatus comprising: memory means including a first area for storing coded representation of image data and a second area for storing raster image data of at least a band; coded-representation forming means for translating respective image data of plural bands into coded representation and storing the coded representation into said first area of said memory means; rendering means for rendering the coded representation from said first area into said second area, in said memory means; coding means for encoding the raster image data rendered in said second area into coded data and storing the coded data by page in said memory means; decoding means for decoding said coded data; decoding-method discrimination means for discriminating whether decoding method performed by said decoding means is a first decoding method capable of transferring decoded raster image data to a printer engine in real time, or a second decoding method for rendering the decoded raster image data in a memory and then transferring the data to the printer engine; and band-height setting means for setting a band height based on the result of discrimination by said decoding-method discrimination means.

If decoding is performed by said second decoding method in accordance with the result of discrimination by said decoding-method discrimination means, said band-height setting means sets the band height to half of that of the first decoding method.

The image processing apparatus further comprises input means for inputting image data in page description language.

The coded-representation forming means converts said page description language into coded representation including at least one of a bitmap object, a run length object, a trapezoidal object, a box object, and a fixed-boundary code object.

The image processing apparatus further comprises age-type discrimination means for discriminating an image type of said image data, wherein said coding means selects a coding method corresponding to the image type discriminated by said image-type discrimination means from plural coding methods and performs coding by the selected coding method.

The image processing apparatus further comprises release means for releasing said first area in which said coded representation is stored after generation of coded page by said coding means.

Further, the present invention provides an image processing method for encoding input image data in band units and storing coded data for one page, then transferring the coded data to a printer engine while decoding the data, comprising: a discrimination step of discriminating whether or not a decoding method for temporarily rendering decoded raster image data in a memory and then transferring the data to the printer engine is used, based on input image data; and a band-height setting step of, if it is discriminated at said discrimination step that said decoding method is used, setting a band height to half of that where said decoding method is not used.

The image processing method further comprises: a translation step of translating the input image data into coded representation by each band having the height set at said band-height setting step; a first storage step of storing said coded representation; a rendering step of rendering the stored coded representation by band into a band raster image; a second storage step of storing said rendered band raster image; a coding step of encoding the stored band raster image and storing said coded data for one page; and decode and transfer steps of temporarily rendering coded data by band and then transferring the rendered data to a printer engine.

At said decoding and transfer step, a memory for two-band raster images is used as a double buffer, and decode and transfer steps are performed in parallel.

Further, the present invention provides a storage medium containing program code, read and executed by a computer, to function as an image processing apparatus which encodes input image data by band and stores coded data for one page, and transfers the coded data to a printer engine while decoding the data, said program code including: program code for discriminating whether or not a decoding method for temporarily rendering decoded raster image data in a memory and then transferring the data to the printer engine is used, based on input image data; and band-height setting program code for, if it is discriminated that said decoding method is used, setting a band height to half of that where said decoding method is not used.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 15 and 16 are block diagrams explaining image processing techniques according to the embodiment of the present invention.

DETAILED DESCRIPTION OF THE PREFERRED EMBODIMENTS

A preferred embodiment of the present invention will now be described in detail in accordance with the accompanying drawings. Note that relative positioning of constituent elements, expressions, numerical values and the like described in the present embodiment do not limit the scope of the invention as long as there is no specific description.

First Embodiment

[Construction]

Figure 1:
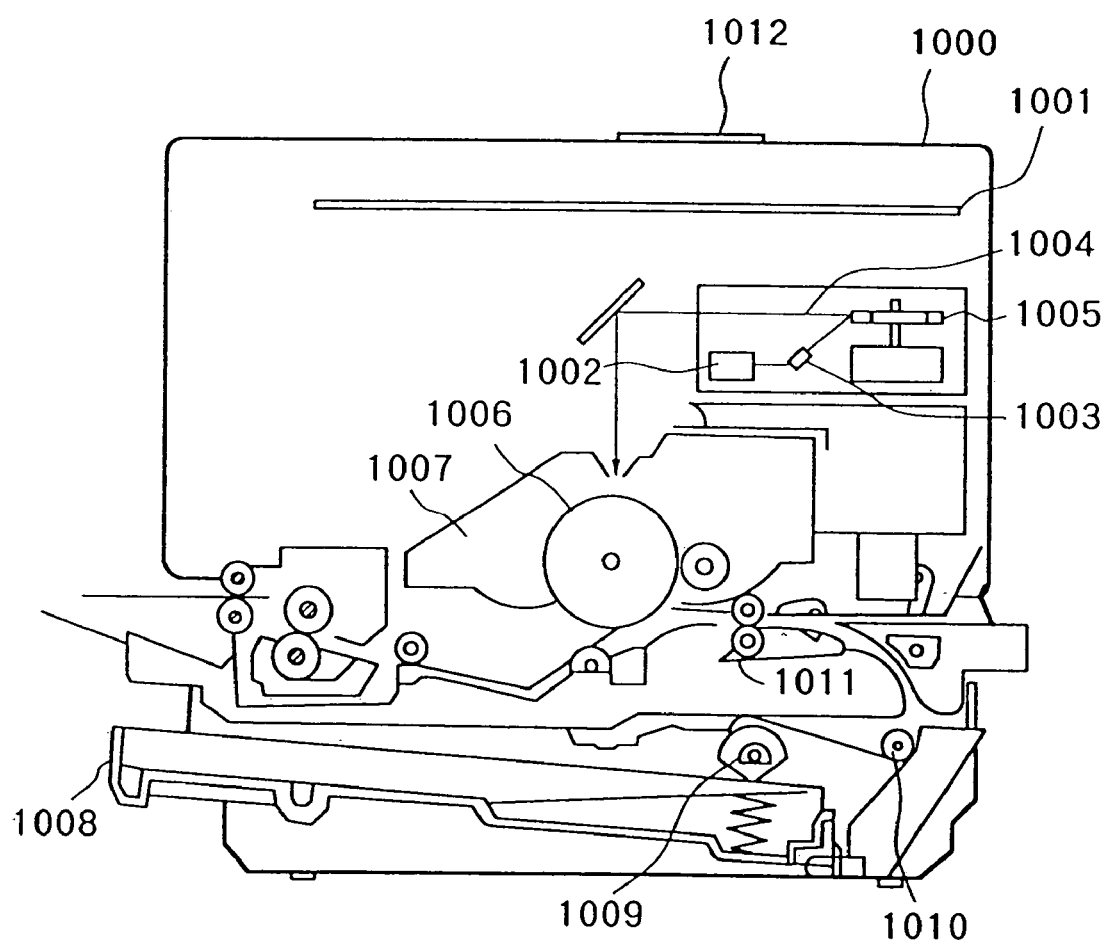
FIG. 1 is a schematic cross-sectional view showing the structure of an image processing apparatus according to an embodiment of the present invention.

FIG. 1 is a cross-sectional view showing the structure of a laser beam printer (hereinafter abbreviated to "LBP") according to an embodiment of the present invention. The LBP is capable of character pattern registration from a data source (not shown) and fixed format (form data) registration.

In FIG. 1, reference numeral 1000 denotes an LBP main body which inputs and stores character information (character code), form information or a macro command supplied from an externally-connected host computer, generates a corresponding character pattern or a form pattern in accordance with the information, and forms an image on a print sheet as a printing medium.

Numeral 1012 denotes an operation panel having switches for operation, an LED display and the like; and 1001, a printer control unit which controls the overall LBP 1000 and interprets character information or the like supplied from the host computer. The control unit 1001 mainly converts character information into a video signal of corresponding character pattern and outputs the signal to a laser driver 1002.

The laser driver 1002 is a circuit to drive semiconductor laser 1003. The laser driver 1002 turns on/off laser light 1004 emitted from the semiconductor laser 1003 in accordance with the input video signal.

The laser light 1004 is swept leftward and rightward by a rotary polygon mirror 1005, and scans on an electrostatic drum 1006. Thus an electrostatic latent image is formed on the electrostatic drum 1006. The latent image is developed by a developing unit 1007 around the electrostatic drum 1006, and is transferred to a print sheet.

The print sheet, which is a cut sheet, is set in a paper cassette 1008. The print sheet is fed into the apparatus with a paper-feed roller 1009 and conveyance rollers 1010 and 1011, and supplied to the electrostatic drum 1006.

Figure 2:
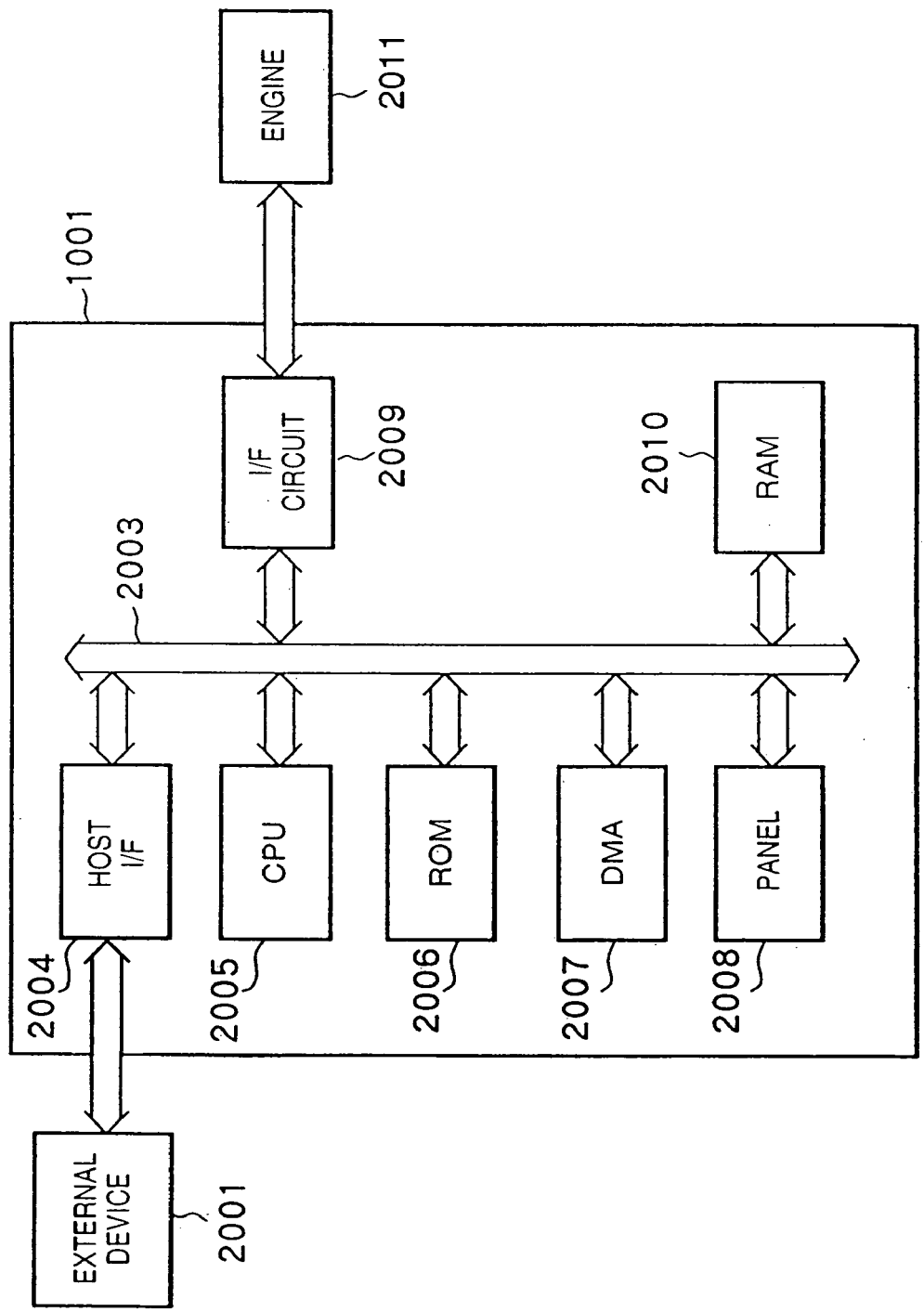
FIG. 2 is a block diagram showing the construction of a printer control unit of the image processing apparatus.

FIG. 2 is a block diagram showing the construction of the control unit 1001 in the LBP 1000.

Numeral 2001 denotes an external device such as a host computer; 2003, an address data bus; 2004, a host I/F including a buffer; 2005, a CPU which controls the control unit; 2006, a ROM in which programs for control-unit control and the like are stored; 2007, a DMA controlled by the CPU; 2008 a panel unit; 2009, an I/F circuit including an output buffer for storing data to be sent to an engine 2011; and 2010, a RAM.

[Processing Technique]

Figure 14:
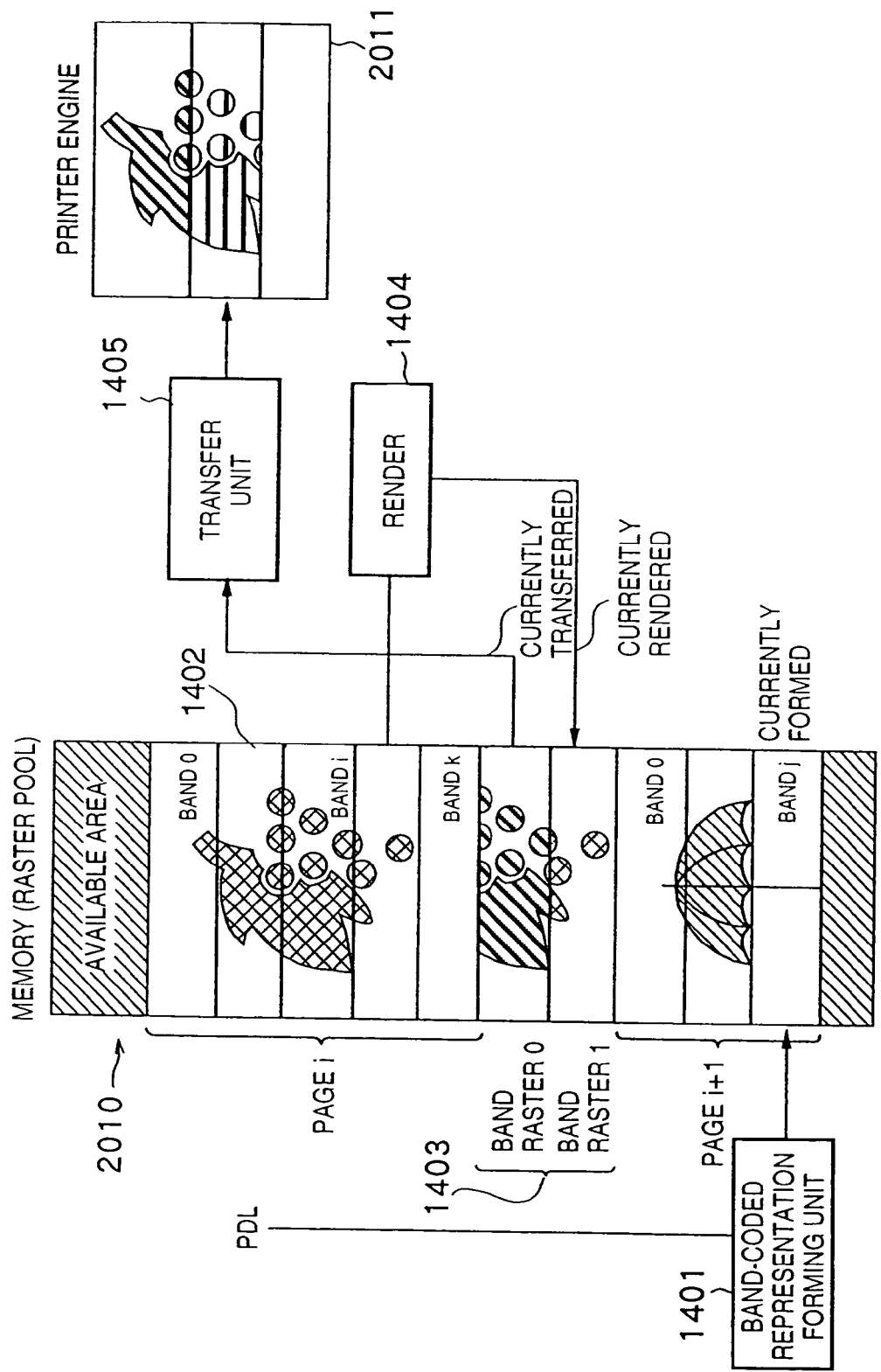
FIG. 14 is a block diagram explaining an image processing technique of the present invention.

Next, an image processing technique of the present invention will be described with reference to the block diagram of FIG. 14.

First, the control unit 1001 of the printer 1000 inputs image data in page description language (PDL) generated by the external device 2001 into the host I/F 2004.

Then, the CPU 2005 functions as a band-coded representation forming unit 1401 in accordance with a program for band coding processing stored in the ROM 2006, to convert the page description language inputted from the external device 2001 into band-coded representation information where the data is divided in band units, and store the information in a band code area 1402 secured in the RAM 2010. The band-coded representation information is a generic name of drawing objects divided in band units, such as "bitmap", "run length", "trapezoidal", "box", and "high-speed boundary-coded bitmap" with a background pattern, and a drawing logic upon rendering them in a raster memory: Note that the details of the band-coded representation information are disclosed in Japanese Published Patent Application No. Hei 6-87251.

Next, the CPU 2005 renders the band-coded representation information in band units by using a rendering unit 1404, and stores the information into a band raster area 1403.

When the rendered raster data has been stored in the band raster area, the CPU 2005 sends a first band via a transfer unit 1405 to the engine 2011 to output the band. While the raster data of the band is outputted, raster data of the next band is rendered in another band raster area 1403. In this manner, data can be outputted from the printer engine without causing data underflow by alternately performing rendering in the band raster area and transfer. Further, at the same time of transfer (print) operation, band-coded representation of the next page is generated.

However, in some cases, image data includes many complicated drawing objects and the band code area 1402 becomes full, accordingly, all the drawing objects cannot be stored as the band-coded representation information. For example, there is a possibility that in one band area in band code area, all the objects to be rendered are not always stored. In this case, as all the drawing objects do not exist in the band code area 1402, if the data is raster-rendered in the band raster area 1403 as described above, a drawing object which cannot be outputted is generated.

[Characteristic Processing Technique]

To solve the above problem, the coded representation is temporarily rendered, and encoded again by a high-compression rate coding method, such that all the image information is stored in the band code area. At this time, the control unit 1001 performs the following page generation processing.

Figure 3:
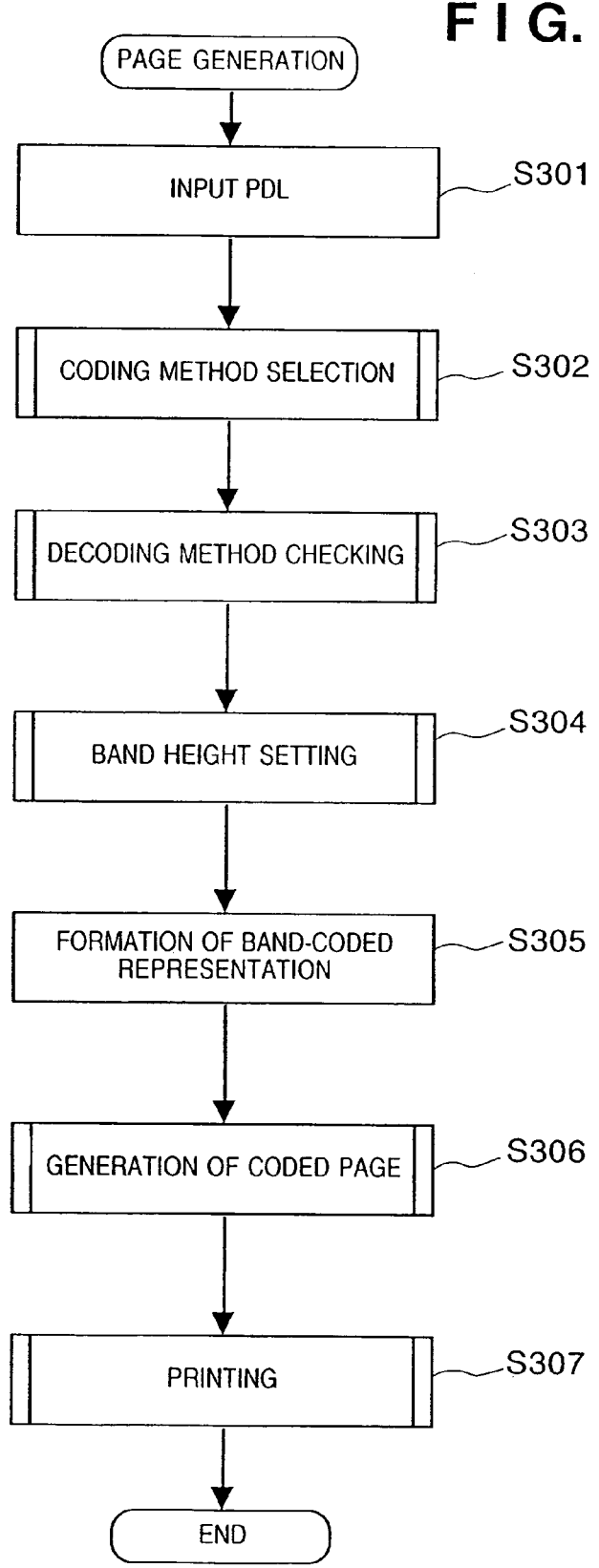
FIG. 3 is a flowchart showing the flow of entire page generation processing in the image processing apparatus.

FIG. 3 is a flowchart showing the entire page generation processing.

At step S301, image data is inputted into the host I/F unit 2004 from the external device such as a host computer. It is preferable that the image data inputted from the host I/F unit 2004 is not in full-raster image format of print image but in compact data format such as page description language (PDL) designating an object or object position on a page. However, the image data may be in any other image data format than the PDL format.

At step S302, the print mode of the input data is interpreted and a coding method is selected. Next, at step S303, a decoding method corresponding to the coding is checked, and at step S304, a band height (width) is set in accordance with the decoding method. In this example, if the decoding method is a non-realtime decoding method, the band height is reduced to half of that in realtime decoding method.

The realtime decoding method is a method in which video transfer to a printer engine after decoding is capable of video-transferring decoded data without temporarily storing the data in a work buffer. Further, "band" is a generic name of each of several same-size strip-shaped data obtained by dividing one-page data in a number of strips. The height of each strip is defined as a band height.

At steps S305 to S307, page generation and transfer processing is performed based on the band height set at step S304.

FIG. 15 shows the page generation and transfer processing in a case where the decoding processing is performed by the realtime decoding method in accordance with the result of checking at step S303.

The input PDL is converted into band-coded representation in the band-coded representation forming unit 1401 and stored into the band code area 1402. If all the image information cannot be stored in the pre-secured band code area, the information is rendered by the rendering unit 1404 by band, and stored into the band raster area 1403. The band raster area has a capacity for storing bitmap data for one band. In this example, the band raster area 1403 and the band code area 1401 are separately provided, however, both areas exist on the RAM 2010. If the band raster area 1403 requires a larger area, the band code area 1401 is reduced. This relation is the same in FIG. 16.

The bitmap data stored in the band raster area 1403 is encoded by the CPU 2005 functioning as the encoder 1501 by the method selected at step 5302. The coded data is stored in a compressed band area 1503. The band code area 1402 is sequentially released corresponding to the bands stored in the compressed band area 1503. When coded data for one page has been stored in the compressed band area 1503, a decoder 1502 decodes the data by band, and sequentially transfers decoded bitmap data via the transfer unit 1405 to the printer engine 2011.

FIG. 16 shows the page generation and transfer processing in a case where the decoding processing is performed by the non-realtime decoding method in accordance with the result of checking at step S303.

The input PDL is converted into band-coded representation in the band-coded representation forming unit 1401, and stored into the band code area 1402. At this time, the band height is set to the height set at step S303, i.e., half of that in the realtime decoding method.

If all the image information cannot be stored in the pre-secured band code area, the information is rendered by the rendering unit 1404 by band, and stored into the band raster area 1403. The band raster area has a capacity for storing bitmap data for one band.

The bitmap data stored in the band raster area 1403 is encoded by the CPU 2005 functioning as the encoder 1501 by the method selected at step S302. Then the coded data is stored into the compressed band area 1503.

When coded data for one page has been stored in the compressed band area 1503, the decoder 1502 decodes the data by band, and renders the data in the band raster 1403. The band raster much have a capacity for two bands to transfer bitmap data to the printer engine 2011 without interruption. While rendering bitmap data in the band raster for one band, bitmap data from the other band raster is sequentially transferred to the printer engine 2011. That is, two band rasters are used as a double buffer for parallel processing. Since the band height has been set to half in advance, in comparison with the case of decoding processing by using the realtime decoding method, the necessary band raster area does not increase to reduce the other memory area.

Hereinbelow, the respective processing at steps S302 to S304 and steps S306 to S307 will be described.

[Coding Method Selection]

Figure 4:
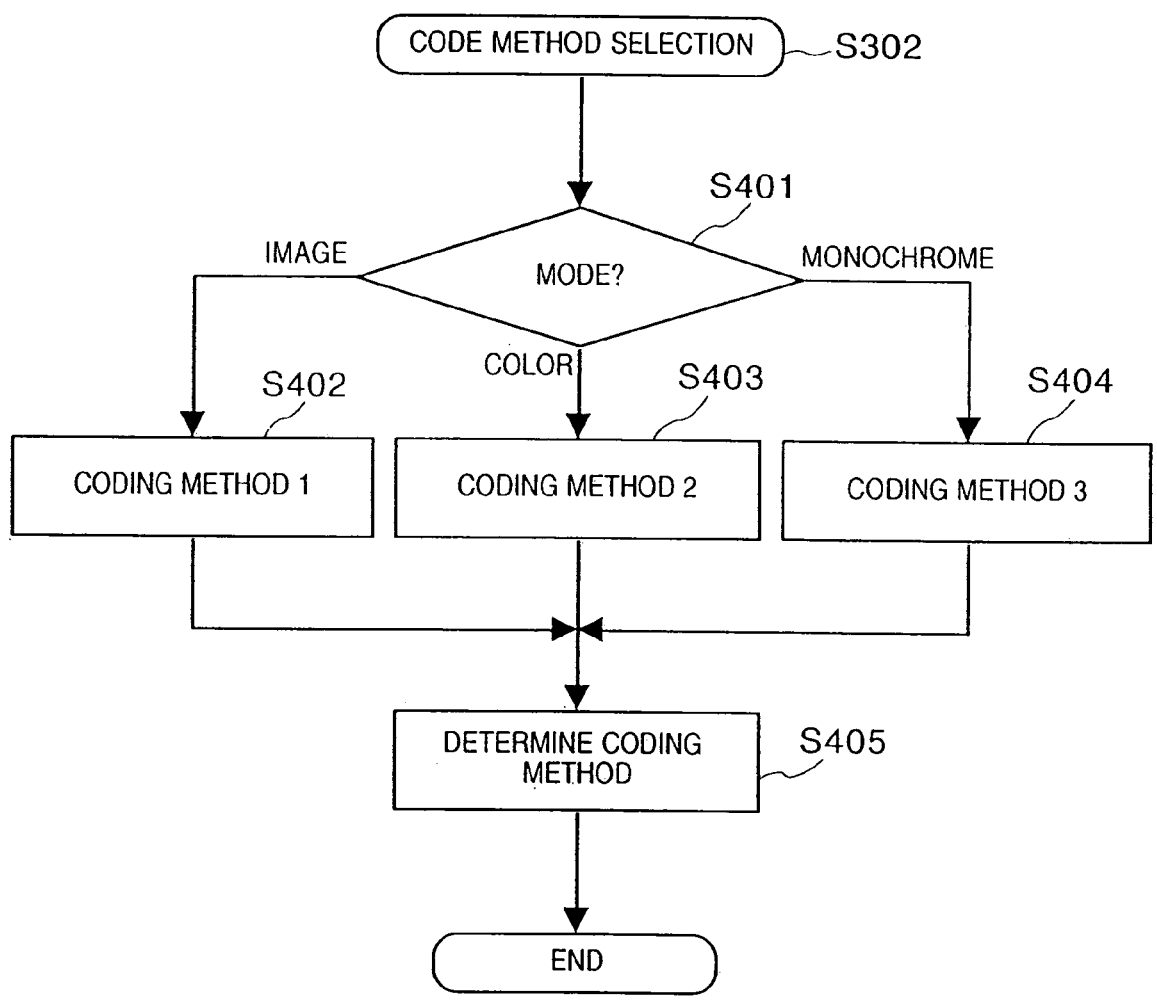
FIG. 4 is a flowchart showing the flow of coding method selection processing in the image processing apparatus.

FIG. 4 is a flowchart showing in detail the coding method selection processing at step S302.

At step S401, mode checking is performed. The mode in this case is one of color mode, monochrome mode, image mode and the like of data to be print-outputted. The color mode can be selected only in use of color printer. If it is determined in the mode checking at step S401 that the mode is the image mode, a coding method 1 is selected at step S402, and at step S405, the coding method 1 is set as the coding method.

Similarly, if it is determined in the mode checking at step S401 that the mode is the color mode, a coding method 2 is selected at step S403, and at step S405, the coding method 2 is set as the coding method. Further, if it is determined in the mode checking at step S401 that the mode is the monochrome mode, a coding method 3 is selected at step S404, and at step S405, the coding method 3 is set as the coding method.

Note that if the conditions of the image mode and the color mode or the monochrome mode overlap with each other, the image mode has a higher priority than the other modes in mode selection. Then, when coding method determination by mode has ended, the coding method selection processing ends at step S406.

[Decoding Method Checking]

Figure 5:
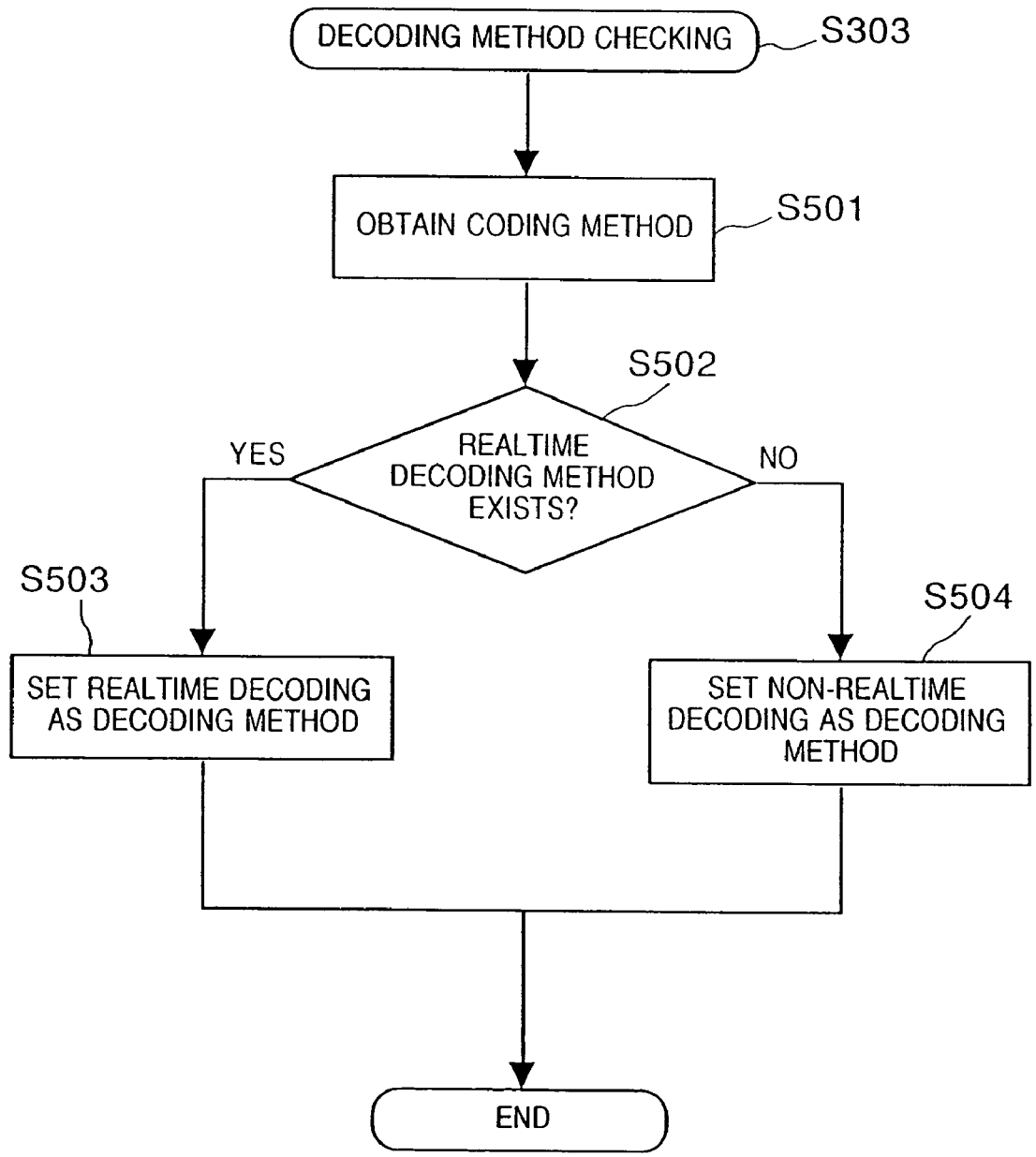
FIG. 5 is a flowchart showing the flow of decoding method checking processing in the image processing apparatus.

FIG. 5 is a flowchart showing in detail the decoding method checking processing at step S303.

At step S501, the coding method selected at step S302 is obtained. At step S502, it is checked whether or not the realtime decoding method exists as a decoding method corresponding to the coding method obtained at step S501.

If it is determined at step S502 that the realtime decoding method exists, the realtime decoding method is set as the decoding method at step S503. On the other hand, if it is determined at step S502 that the realtime decoding does not exist, the non-real decoding method is set as the decoding method at S504. When the decoding method has been set, the processing ends.

[Band Height Setting]

Figure 6:
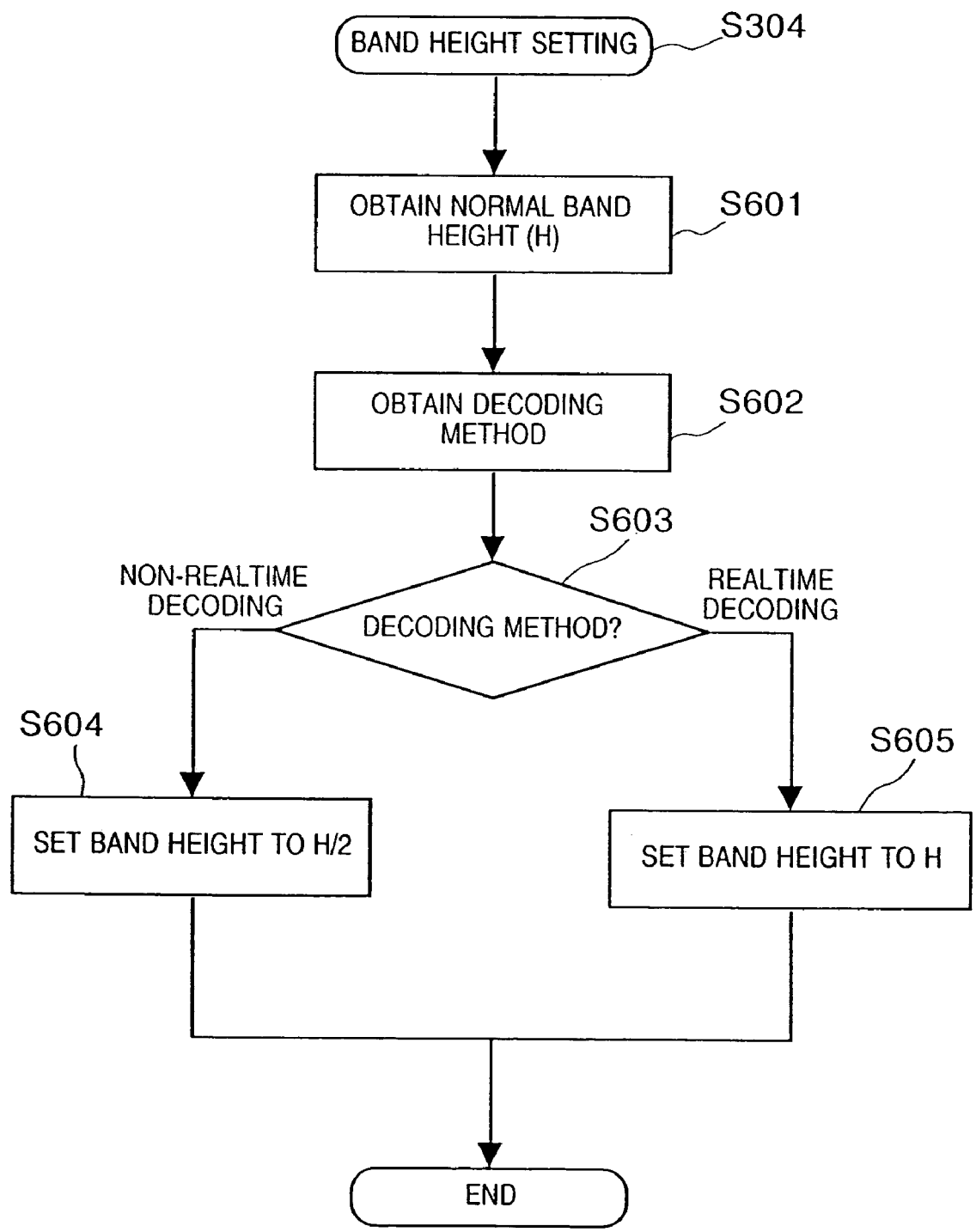
FIG. 6 is a flowchart showing the flow of band-height setting processing in the image processing apparatus.

FIG. 6 is a flowchart showing in detail the band-height setting processing at step S304.

Generally, the band height is determined relatively based on an area for storing one-page data. The larger the height is, the less the amount of boundary raster between bands is, i.e., the smaller the amount of overlapped data, therefore, memory efficiency is higher. In this embodiment, the set band height is "H".

At step S601, the set band height (H) is obtained.

At step S602, the decoding method checked at step S303 in FIG. 3 is obtained.

At step S603, if the decoding method obtained at step S602 is the non-realtime decoding method, the process proceeds to step S604, at which the band height is set to half (H/2). On the other hand, if the decoding method obtained at step S602 is the realtime decoding, the process proceeds to step S605, at which the band height is set with the same value (H).

Then the band-height setting processing ends.

[Coding Processing]

Figure 7:
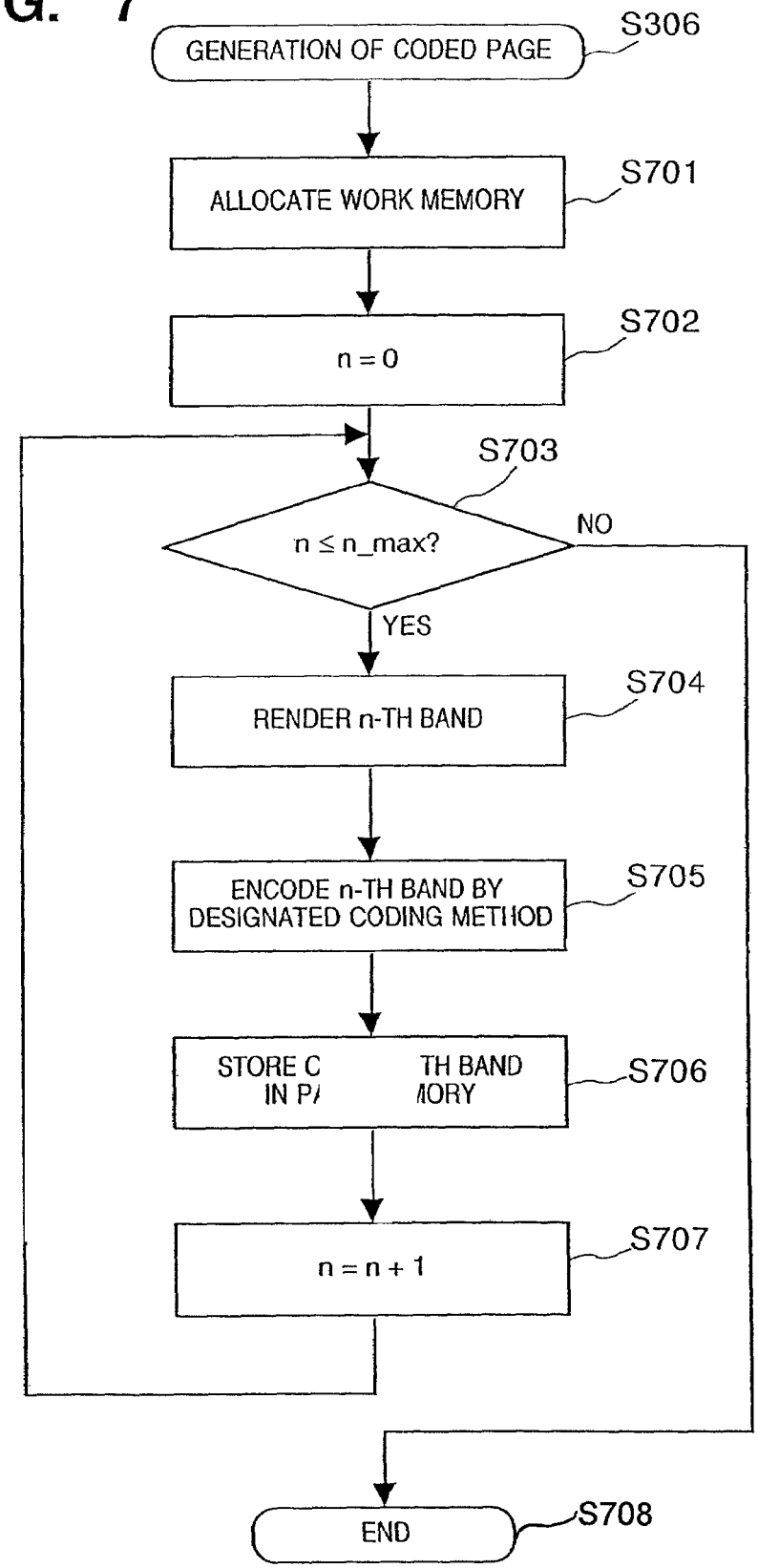
FIG. 7 is a flowchart showing the flow of coded-page generation processing in the image processing apparatus.

In band-coded representation, if all the image information cannot be stored in the band code area, a coded page is generated by processing as shown in FIG. 7.

FIG. 7 is a flowchart showing in detail the coded-page generation processing at step S306.

At step S701, a work memory is allocated. The work memory here means a band raster area for storing decoded bitmap data. The work memory has a capacity the same as that of the band generated in proportion to the band height determined at step S304. At step S702, a value "n" indicating a band number is initialized to "0". The value "n" is an integer satisfying $$0 <= n <= n\_max$$

n_max: an integer as a maximum band number

At step S703, it is checked whether or not the value "n" indicating the current band number exceeds "n_max". If the value "n" exceeds "n_max", it is determined that all the bands have been processed, and the processing ends at step S708. If it is determined at step S703 that the value "n" does not exceed "n_max", the process proceeds to step S704.

At step S704, the band-coded representation at step S305 is rendered in the work memory obtained at step S701.

Next, at step S705, the bitmap data rendered in the work memory at step S704 is encoded by the coding method selected at step S302 in FIG. 3.

At step S706, the coded data is stored into the compressed band area 1503.

At step S707, the current band number "n" is incremented for the next band (n=n+1).

The process returns to step S603, at which the above processing is repeated to the final band, then the coded-page generation processing ends.

[Decoding and Transfer Processing]

Figure 8:
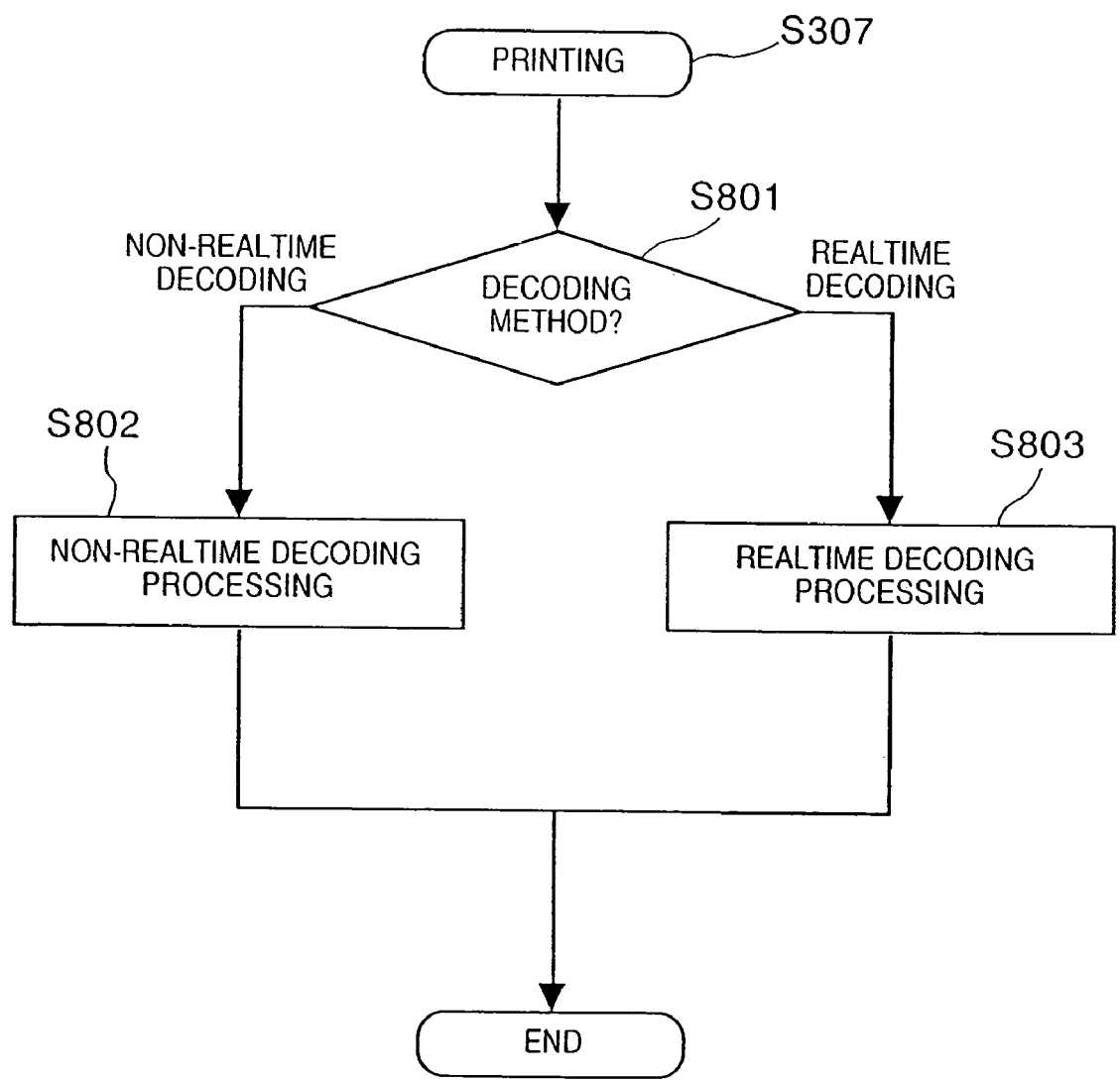
FIG. 8 is a flowchart showing the flow of decoding and transfer processing in the image processing apparatus.

FIG. 8 is a flowchart showing in detail the decoding and transfer processing at step S307.

At step S801, it is checked whether the coding method selected by the decoding method checking at step S303 in FIG. 3 is a realtime decoding method or a non-realtime decoding method. If the decoding method is a realtime decoding method, the process proceeds to step S803, at which the realtime decoding processing is performed, while if the decoding method is a non-realtime decoding method, the process proceeds to step S802, at which band decoding processing is performed.

Figure 9:
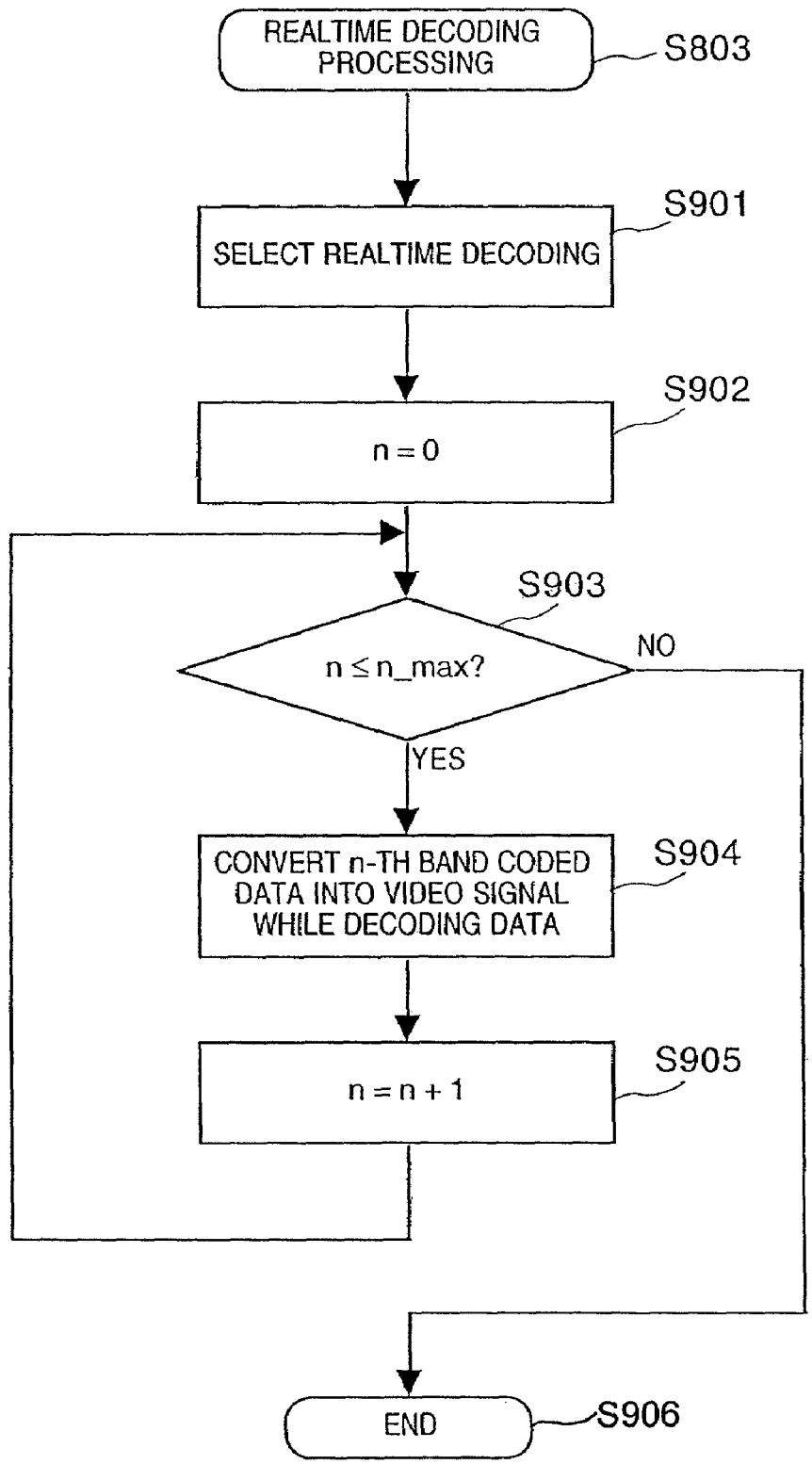
FIG. 9 is a flowchart showing the flow of realtime decoding processing in the image processing apparatus.

FIG. 9 is a flowchart showing in detail the realtime decoding processing at step S803.

At step S901, a realtime decoding method is selected as the decoding method. At step S902, the current band number "n" is initialized to "0". Note that the number "n" is an integer satisfying $$0 <= n <= n\_max$$

n_max: an integer as a maximum band number

At step S903, it is checked whether or not the current band number "n" exceeds "n_max". If the number "n" exceeds "n_max", it is determined that all the bands have been decoded, and the process proceeds to step S906, at which the realtime decoding processing is terminated. On the other hand, if the current band number "n" does not exceeds "n_max", the process proceeds to step S904.

At step S904, coded data of the "n"-th band is converted into a video signal and transferred to the printer engine while coded data is decoded, thus decoding and transfer of the band is performed.

At step S905, the current band number "n" is incremented for the next band "n=n+1".

Then the process returns to step S903, at which the above processing is repeated to the final band, then the realtime decoding processing ends, and the decoding and transfer processing ends.

Figure 10:
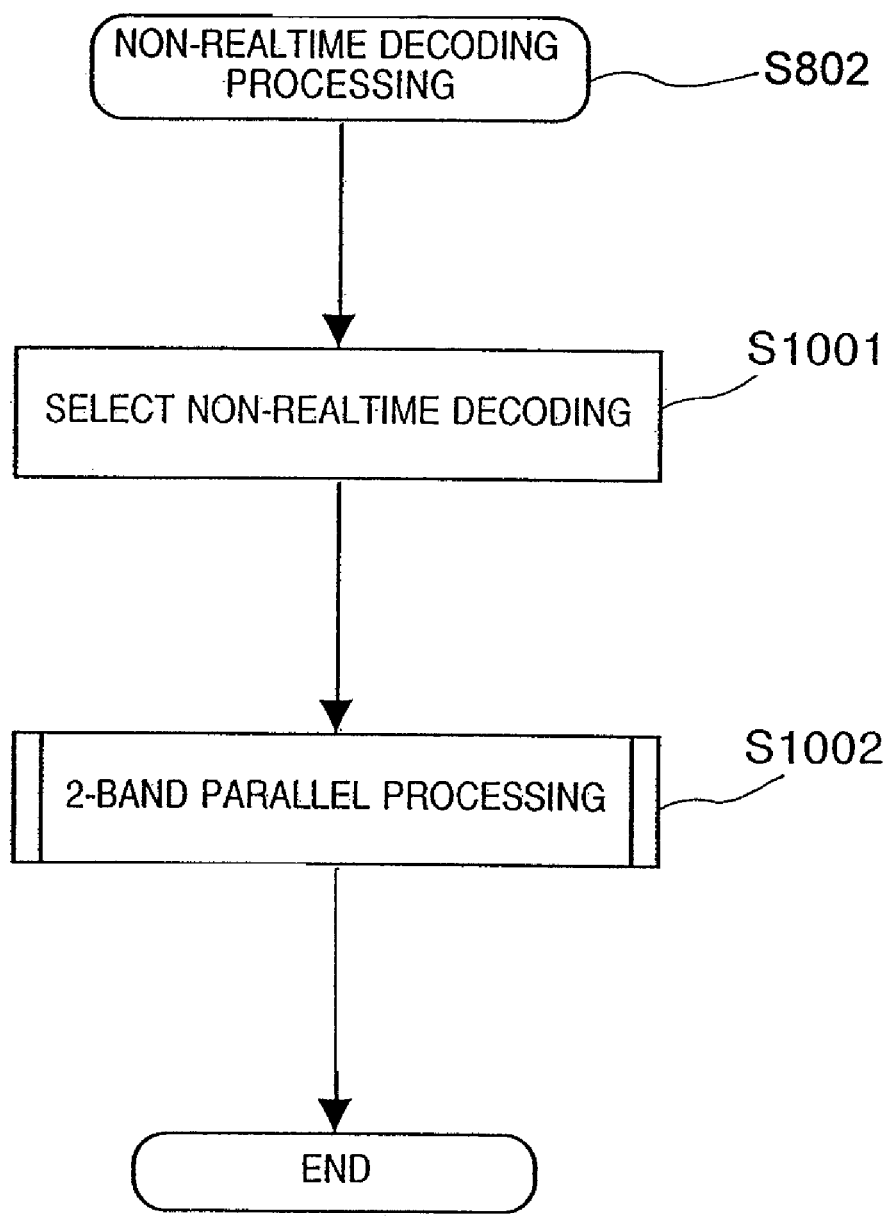
FIG. 10 is a flowchart showing the flow of non-realtime decoding processing in the image processing apparatus.

On the other hand, if it is determined at step S801 in FIG. 8 that the decoding method is a non-realtime decoding method, the non-realtime decoding processing is performed at step S802. The details of the non-realtime decoding processing will be described with reference to the flowchart of FIG. 10.

Figure 11:
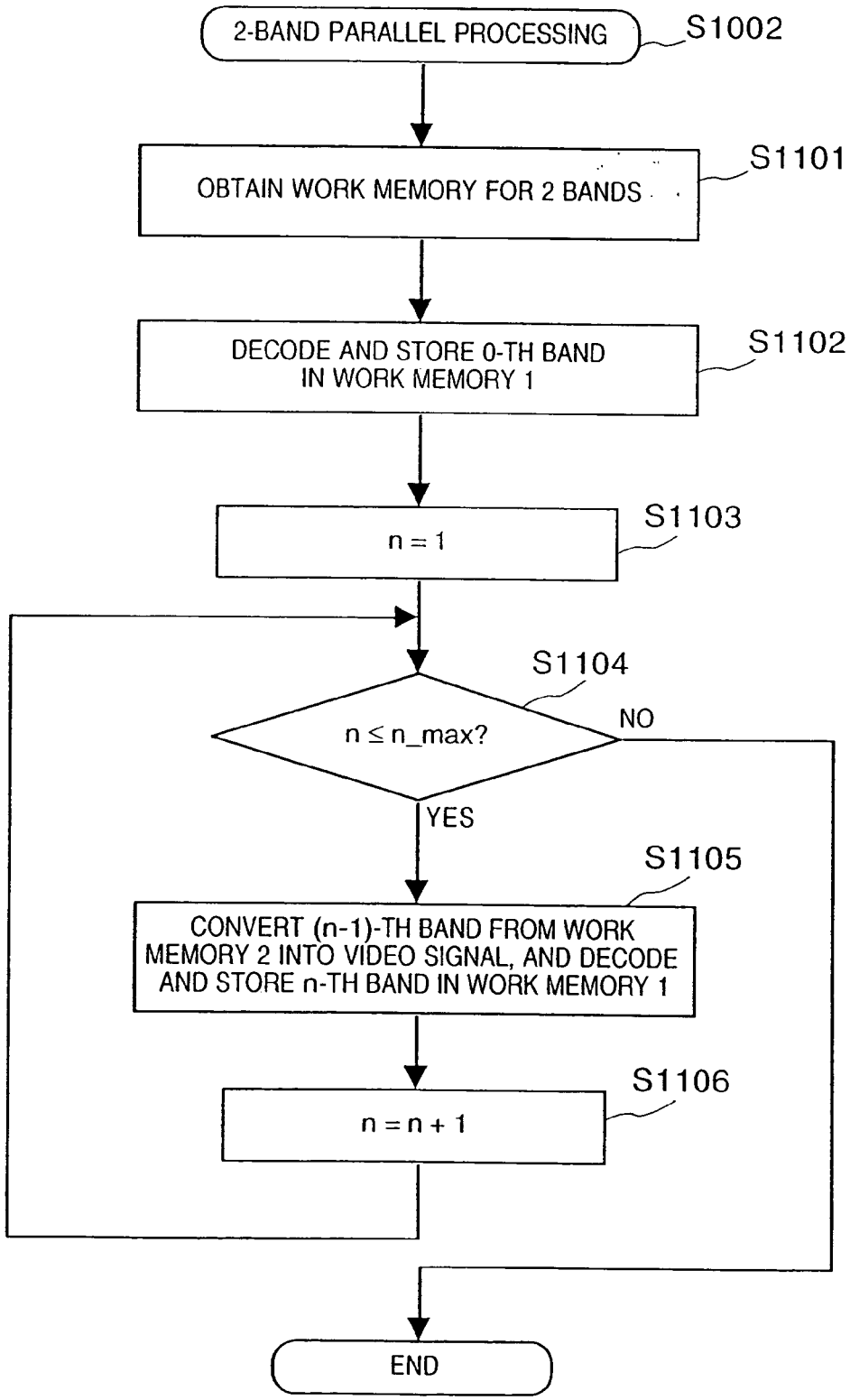
FIG. 11 is a flowchart showing the flow of 2-band parallel processing in the image processing apparatus.

At step S1001, a non-realtime decoding method is selected as the decoding method. Next, at step S1002, band processing is performed. The details of the band processing will be described with reference to the flowchart of FIG. 11.

At step S1101, a work memory for two bands is obtained. The work memory has a memory size twice of that of the work memory obtained at step S701 in FIG. 7, but the memory size is the same as that of the work memory obtained upon realtime decoding (H/2×2). That is, as the band height is reduced to half, there is no difference in the size of the work memory between realtime decoding and non-realtime decoding. The respective work memories will be referred to as a work memory 1 and a work memory 2.

First, at step S1102, 0-th band coded data is decoded and stored into the work memory 1.

At step S1103, the current band number "n" is initialized to "1".

Note that the number "n" is an integer satisfying

1<=n<=n_max n_max: an integer as a maximum band number

At step S1104, it is checked whether or not the current band number "n" exceeds the final band "n_max". If the number "n" does not exceed the final band "n_max", the process proceeds to step S1105.

At step S1105, "n−1"-th band from the work memory 1 is converted into a video signal and transferred to the printer engine, thus decoding and transfer processing is performed on the "n−1"-th band. First, the 0-th band data decoded at step S1102 is processed. In parallel to this processing, the "n"-th band data is decoded and the decoded data is stored into the work memory 1. First, the 1-th band coded data is decoded and stored into the memory.

The process proceeds to step S1106, at which the current band number "n" is incremented to the next band number (n=n+1)

Figure 12:
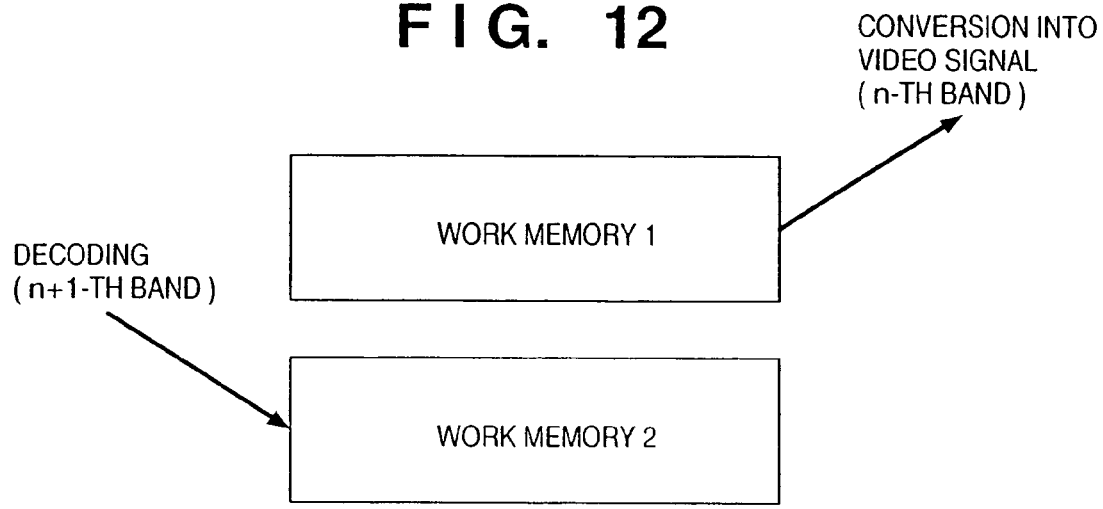
FIGS. 12 and 13 are block diagrams explaining the 2-band parallel processing in the image processing apparatus.
Figure 13:
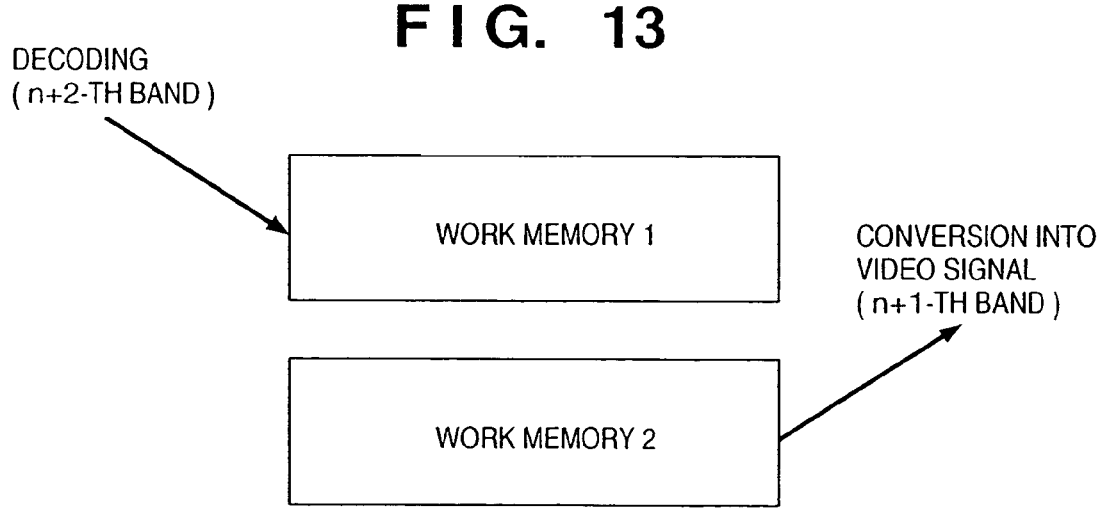

FIGS. 12 and 13 illustrate these processing.

First, in FIG. 12, the "n"-th band decoded data, already decoded and stored in the work memory 1, is converted into a video signal and transferred to the printer engine, while the "n+1"-th band coded data is decoded and stored into the work memory 2.

Next, in FIG. 13, the data decoded in the work memory 1 in FIG. 12 is similarly converted into a video signal and transferred to the printer engine, on the other hand, as the "n"-th band data, already converted to the video signal is unnecessary, decoding is performed on "n+2"-th band data in the work memory 1.

The processing in FIGS. 12 and 13 is continued till the final band is processed.

Note that in this processing, decoding and storage to one work memory must be completed before the completion of video transfer from the other work memory to the printer engine.

Next, the process returns to step S1104 to continue the above processing until the final band is processed.

If it is determined at step S1104 that the final band has been processed, the decoding and transfer processing ends.

Other Embodiments

In the above embodiment, the image mode, the color mode and the monochrome mode are handled in mode selection, however, other modes may be used.

In the above embodiment, three types of coding methods are used, however, the number of types of coding methods is not limited.

In the above embodiment, two or more bands are handled, however, more bands may be handled.

In the above embodiment, the work memory is allocated upon coding and decoding, however, a fixed area may be provided.

In the above embodiment, two or more bands are handled, however, a single band may be handled.

In the above embodiment, in mode selection, if the image mode and the color mode or monochrome mode overlap with each other, the image mode is a higher priority in mode selection, however, another mode may be a higher priority.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium storing the program code constitutes the invention. Furthermore, besides aforesaid functions according to the above embodiment are realized by executing the program code which is read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

Where the present invention is applied to the aforesaid storage medium, the storage medium stores program code corresponding to the above-described flowcharts (especially FIG. 3 and FIG. 6)

According to the present invention, image transfer processing can be performed by using a fixed size work buffer even if different decoding methods are used. Thus, high-quality image processing apparatus and image processing method capable of high-quality image processing without physically increasing memory capacity can be provided.

As many apparently widely different embodiments of the present invention can be made without departing from the spirit and scope thereof, it is to be understood that the invention is not limited to the specific embodiments thereof except as defined in the appended claims.

What is claimed is:

1. A printer control apparatus comprising:
a real-time decoding unit which decodes band coded data, converts decoded data into video signals and transmits the video signals to a printer engine, without temporarily storing the decoded data in a band raster area of memory;
a non real-time decoding unit which decodes the band coded data, stores the decoded data into a first area of the band raster area of the memory, converts data stored in a second area of the band raster area of the memory into video signals and transmits the video signals to a printer engine;
a setting unit which sets a band height at a higher value if the real-time decoding unit is to be used, and sets a band height at a lower value if the non-real-time decoding unit is to be used;
a rendering unit which renders bitmap data having the band height at the higher value into a band raster area of the memory when the band height is set to the higher value by the setting unit, and renders bitmap data having the band height at the lower value into a band raster area of the memory when the band height is set to the lower value by the setting unit; and
an encoding unit which encodes the bitmap data rendered by the rendering unit into the band coded data,
wherein the real-time decoding unit is activated after the bitmap data having the band height at the higher value is encoded by the encoding unit, and
the non-real-time decoding unit is activated after the bitmap data having the band height at the lower value is encoded by the encoding unit.

2. The apparatus according to claim 1, further comprising a coded page generation unit which allocates a memory based on the band height set by the setting unit, renders data in the memory, encodes the rendered data, and stores the coded data into a page memory.

3. The apparatus according to claim 1, wherein the lower value is half of the higher value.

4. A printer control apparatus comprising:
a printer engine;
a real-time decoding unit which decodes band coded data, converts data into video signals and transmits the video signals to the printer engine, without temporarily storing the decoded data in a band raster of memory;
a non-real-time decoding unit which decodes the band coded data, stores the decoded data into a first area of the band raster area of the memory, converts data stored in a second area of the band raster area of the memory into video signals and transmits the video signals to the printer engine;
a setting unit which sets a band height at a higher value if the real-time decoding unit is to be used, and sets a band height at a lower value if the non-real-time decoding unit is to be used;
a rendering unit which renders bitmap data having the band height at the higher value into a band raster area of the memory when the band height is set to the higher value by the setting unit, and renders bitmap data having the band height at the lower value into a band raster area of the memory when the band height is set to the lower value by the setting unit; and
an encoding unit which encodes the bitmap data rendered by the rendering unit into the band coded data,
wherein the realtime decoding unit is activated after the bitmap data having the band height at the higher value is encoded by the encoding unit, and
the non-real-time decoding unit is activated after the bitmap data having the band height at the lower value is encoded by the encoding unit.

5. A printer control method comprising:
a real-time decoding step of using a realtime decoding unit to decode band coded data, convert data into video signals and transmitting the video signals to the printer engine, without temporarily storing the decoded data in a band raster of memory;
a non-real-time decoding step of using a non-real-time decoding unit to decode the band coded data, storing the decoded data into a first area of the band raster area of the memory, converting data stored in a second area of the band raster area of the memory into video signals and transmitting the video signals to the printer engine;
a setting step of setting a band height at a higher value if the real-time decoding unit is to be used, and setting a band height at a lower value if the non-real-time decoding unit is to be used,
a rendering unit which renders bitmap data having the band height at the higher value into the band raster area of the memory when the band height is set to the higher value by the setting unit, and renders bitmap data having the band height at the lower value into the band raster area of the memory when the band height is set to the lower value by the setting unit; and
an encoding unit which encodes the bitmap data rendered by the rendering unit into the band coded data,
wherein the real-time decoding unit is activated after the bitmap data having the band height at the higher value is encoded by the encoding unit, and
the non-real-time decoding unit is activated after the bitmap data having the band height at the lower value is encoded by the encoding unit.

6. The method according to claim 5, further comprising a coded page generation step of allocating a memory based on the band height set in the setting step, rendering data in the memory, encoding the rendered data, and storing the coded data into a page memory.

7. The method according to claim 5, wherein the lower value is half of the higher value.

* * * * *